(12) United States Patent
Kimura

(10) Patent No.: US 11,017,615 B2
(45) Date of Patent: May 25, 2021

(54) INFORMATION PROCESSING SERVER THAT PROVIDES INFORMATION OF POSITION OF CHARGING STATION, INFORMATION PROCESSING METHOD, VEHICLE, CONTROL METHOD OF VEHICLE, NON-TRANSITORY COMPUTER-READABLE STORAGE MEDIUM, AND INFORMATION PROVIDING SYSTEM

(71) Applicant: HONDA MOTOR CO., LTD., Tokyo (JP)

(72) Inventor: Mitsuki Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/599,270

(22) Filed: Oct. 11, 2019

(65) Prior Publication Data

US 2020/0126322 A1  Apr. 23, 2020

(30) Foreign Application Priority Data

Oct. 23, 2018 (JP) .............................. JP2018-199395

(51) Int. Cl.
*G07C 5/00* (2006.01)
*G06F 16/23* (2019.01)
*G06F 16/29* (2019.01)
*G07C 5/08* (2006.01)

(52) U.S. Cl.
CPC ......... *G07C 5/008* (2013.01); *G06F 16/2379* (2019.01); *G06F 16/29* (2019.01); *G07C 5/08* (2013.01)

(58) Field of Classification Search
CPC ....... G07C 5/008; G07C 5/08; G06F 16/2379; G06F 16/29
USPC ........................................................... 340/993
See application file for complete search history.

(56) References Cited

U.S. PATENT DOCUMENTS

| 7,277,028 B1* | 10/2007 | Janke ............... G08G 1/096716 340/905 |
| 8,768,624 B2 | 7/2014 | Kobayashi et al. |
| 2012/0089329 A1* | 4/2012 | Kim ................... G01C 21/3476 701/426 |
| 2012/0136574 A1 | 5/2012 | Kobayashi et al. |
| 2017/0217319 A1* | 8/2017 | Araki ...................... G01B 21/16 |
| 2018/0143035 A1* | 5/2018 | Ricci ....................... B60R 11/04 |

(Continued)

FOREIGN PATENT DOCUMENTS

JP  5575760 B2  8/2014
WO  2010/137307 A1  12/2010

*Primary Examiner* — Omar Casillashernandez
(74) *Attorney, Agent, or Firm* — Thomas | Horstemeyer, LLP

(57) ABSTRACT

An information processing server comprises: a receiver that receives, from a vehicle chargeable from an outside, predetermined information of the vehicle; a memory; and at least one processor or circuit which functions as: an estimation unit configured to estimate, based on the predetermined information received from each of a plurality of vehicles, a position of a charging station used to charge the vehicle; and a providing unit configured to provide information of the estimated position of the charging station such that the estimated position of the charging station is reflected on map information.

11 Claims, 9 Drawing Sheets

(56) References Cited

U.S. PATENT DOCUMENTS

| | | | | |
|---|---|---|---|---|
| 2018/0202825 A1* | 7/2018 | You | ............... | B60L 58/12 |
| 2019/0204840 A1* | 7/2019 | Park | ............... | H04W 4/029 |
| 2019/0315244 A1* | 10/2019 | Bartz | ............... | H02J 50/10 |
| 2020/0126322 A1* | 4/2020 | Kimura | ............... | G06F 16/29 |

* cited by examiner

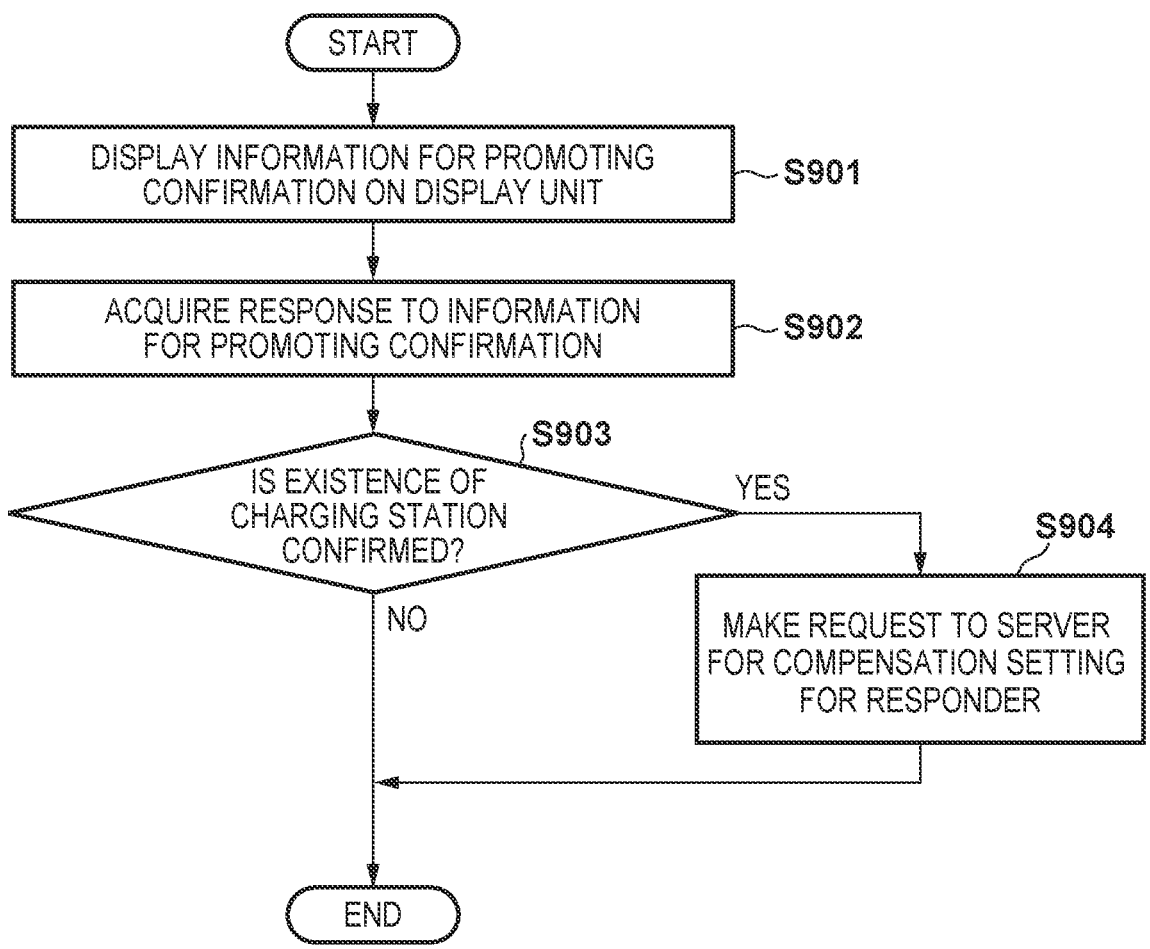

INFORMATION PROCESSING SERVER THAT PROVIDES INFORMATION OF POSITION OF CHARGING STATION, INFORMATION PROCESSING METHOD, VEHICLE, CONTROL METHOD OF VEHICLE, NON-TRANSITORY COMPUTER-READABLE STORAGE MEDIUM, AND INFORMATION PROVIDING SYSTEM

CROSS-REFERENCE TO RELATED APPLICATION

This application claims priority to and the benefit of Japanese Patent Application No. 2018-199395 filed on Oct. 23, 2018, the entire disclosure of which is incorporated herein by reference.

BACKGROUND OF THE INVENTION

Field of the Invention

The present invention relates to an information processing server that provides the information of the position of a charging station, an information processing method, a vehicle, a control method of a vehicle, a non-transitory computer-readable storage medium, and an information providing system.

Description of the Related Art

In recent years, vehicles (for example, electric motor vehicles) chargeable from the outside are increasing. Along with this, requirements of stopping by a charging station existing at a destination, halfway through a route to a destination, or in the vicinity of these and charging a vehicle are also increasing.

To meet such a requirement, there has been proposed a technique of searching for the position of a charging station on a map and guiding a vehicle such that it can stop by an optimum charging station in the neighborhood of a route to a destination or a via-point (Japanese Patent No. 5575760).

On the other hand, installation of new charging stations has progressed along with the increase in electric motor vehicles. A newly installed charging station can be used by a person who passes by the neighborhood and finds it before it is reflected on the map. However, the position of the charging station is neither displayed during traveling nor taken into consideration at the time of route setting unless the position is collected by a specific operator, and its data is provided to reflect the position on the map of the electric motor vehicle. For this reason, there is a demand for a technique capable of more easily and more quickly reflecting the position of a newly installed charging station on a map without depending on a specific operator.

SUMMARY OF THE INVENTION

The present disclosure has been made in consideration of the aforementioned issues, and realizes a technique capable of quickly specifying the position of a charging station in use and reflecting it on a map.

In order to solve the aforementioned problems, one aspect of the present disclosure provides an information processing server comprising: a receiver that receives, from a vehicle chargeable from an outside, predetermined information of the vehicle; a memory; and at least one processor or circuit which functions as: an estimation unit configured to estimate, based on the predetermined information received from each of a plurality of vehicles, a position of a charging station used to charge the vehicle; and a providing unit configured to provide information of the estimated position of the charging station such that the estimated position of the charging station is reflected on map information.

Another aspect of the present disclosure provides an information processing method comprising: receiving, from a vehicle chargeable from an outside, predetermined information of the vehicle; estimating, based on the predetermined information received from each of a plurality of vehicles, a position of a charging station used to charge the vehicle; and providing information of the estimated position of the charging station such that the estimated position of the charging station is reflected on map information.

Still another aspect of the present disclosure provides, a vehicle that is chargeable from an outside, comprising: a memory; and at least one processor or circuit which functions as: an acquisition unit configured to acquire predetermined information of the vehicle; an estimation unit configured to estimate, based on the predetermined information, a position of a charging station used to charge the vehicle; and a providing unit configured to provide the estimated position of the charging station to an external information processing server such that the estimated position of the charging station is reflected on map information.

Yet another aspect of the present disclosure provides, a control method of a vehicle that is chargeable from an outside, the method comprising: acquiring predetermined information of the vehicle; estimating, based on the predetermined information, a position of a charging station used to charge the vehicle; and providing the estimated position of the charging station to an external information processing server such that the estimated position of the charging station is reflected on map information.

Still yet another aspect of the present disclosure provides, an information providing system that comprises a plurality of vehicles chargeable from an outside, and an information processing server, wherein the vehicle comprises: a transmitter that transmits predetermined information acquired in the vehicle to the information processing server; and a display for displaying map information; the information processing server comprises: a receiver that receives, from the vehicle, the predetermined information of the vehicle; a memory; and at least one processor or circuit which functions as: an estimation unit configured to estimate, based on the predetermined information received from each of a plurality of vehicles, a position of a charging station used to charge the vehicle; and a providing unit configured to provide information of the estimated position of the charging station to the vehicle such that the estimated position of the charging station is reflected on the map information displayed in the vehicle.

Yet still another aspect of the present disclosure provides a non-transitory computer-readable storage medium storing a program for causing a computer to function as each unit of an information processing server, wherein the information processing server comprises: a receiver that receives, from a vehicle chargeable from an outside, predetermined information of the vehicle; a memory; and at least one processor or circuit which functions as: an estimation unit configured to estimate, based on the predetermined information received from each of a plurality of vehicles, a position of a charging station used to charge the vehicle; and a providing unit configured to provide information of the estimated position of the charging station such that the estimated position of the charging station is reflected on map information.

According to the present invention, it is possible of quickly specify the position of a charging station in use and reflect it on a map.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is a flowchart showing a series of operations of confirmation processing in the vehicle according to the second embodiment.

DESCRIPTION OF THE EMBODIMENTS

First Embodiment

An exemplary embodiment of the present invention will now be described in detail with reference to the accompanying drawings. In the first embodiment, an example in which estimation of the position of a charging station is performed by an information processing server will be described.

<Arrangement of Information Providing System>

Figure 1:
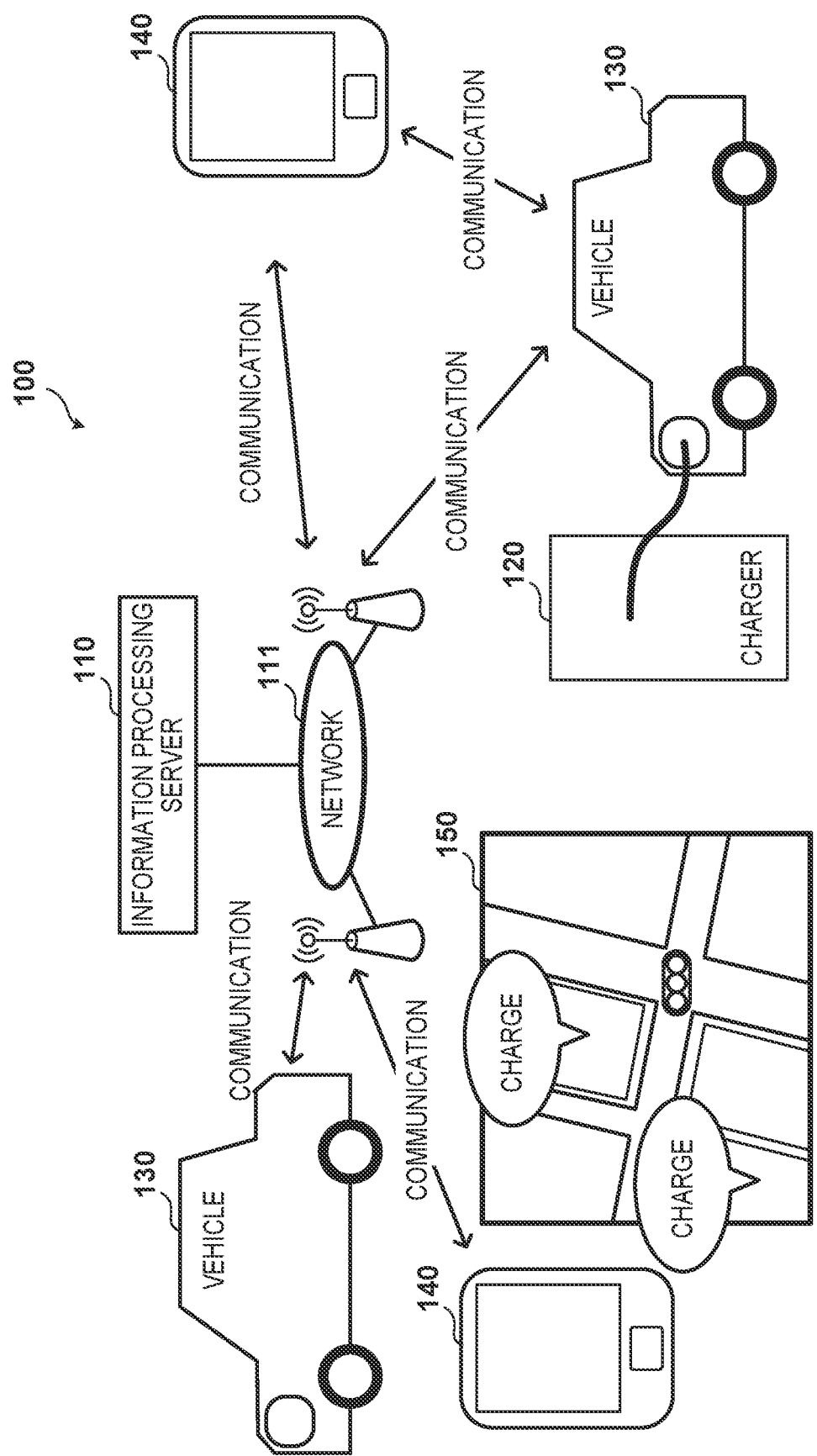
FIG. 1 is a view showing an example of an information providing system according to the first embodiment of the present invention.

The arrangement of an information providing system 100 according to this embodiment will be described with reference to FIG. 1. A vehicle 130 is a vehicle chargeable from the outside, and is, for example, an electric motor vehicle such as an electric vehicle. However, the vehicle is not limited to an electric motor vehicle, and may include a plug-in hybrid vehicle as long as it is a vehicle chargeable from the outside.

In addition, the vehicle 130 can measure the state in the vehicle by various sensors in the vehicle and transmit collected data to an information processing server 110. The thus collected and transmitted data is also generally called floating data, probe data, traffic information, or the like. Such data will simply be referred to as information concerning the vehicle in the following explanation. In this embodiment, as examples of the information concerning the vehicle, the identification information of the vehicle, and information concerning the position of the vehicle, the vehicle speed, the charging amount of a battery, connection of a cable to a charging port, opening/closing of the charging port, and the like will be described. However, the information concerning the vehicle may further include another information. The pieces of information concerning the vehicle are transmitted to the information processing server 110 at a predetermined interval or in accordance with the occurrence of a specific event.

In this embodiment, a communication apparatus 140 is, for example, a smartphone. However, the communication apparatus is not limited to this, and may include a personal computer, a tablet terminal, a smart watch, a game machine, and the like.

The information processing server 110 is formed by one or more server apparatuses, acquires information concerning the vehicle transmitted from the vehicle 130 or the communication apparatus 140 via a network 111, and estimates the position of a charging station. In addition, the information processing server 110 can also confirm the information of the estimated position of the charging station based on information concerning the charging station transmitted from the vehicle 130 or the communication apparatus 140. The information processing server 110 provides the estimated position of the charging station to the vehicle 130 or the communication apparatus 140 such that the estimated position of the charging station is reflected on map information. The network 111 includes, for example, a communication network such as the Internet or a cellular network, and transmits information between the information processing server 110 and the vehicle 130 or the communication apparatus 140.

The vehicle 130 stops at a charging station in a service area or the like, and is charged with electricity from a charger 120 arranged in the charging station. The charger 120 includes a charging plug for quick charging complying with a standard, for example, CHAdemo or Combo1. In quick charging, for example, CHAdemo uses a DC current of a high voltage of 500 V, and Combo1 uses a DC current of a high voltage of 1,000 V. Note that a home charger generally outputs an AC current of 100 V or 200 V.

In addition, the vehicle 130 transmits information concerning the vehicle to the information processing server 110. The vehicle 130 then acquires the information of the position of the charging station from the information processing server 110, and uses the information of the position of the charging station together with the map information used in the vehicle 130. A display 150 schematically shows an example of map information displayed on a display unit in the vehicle 130 or the display unit of the communication apparatus 140, and information representing the existence of charging stations is displayed on the map.

The communication apparatus 140 can communicate with the vehicle 130 via wireless communication, for example, Bluetooth® or communicate with the information processing server 110 via the network 111 such as a cellular network. The communication apparatus 140 is associated with the vehicle 130 by, for example, performing pairing with the vehicle 130 in advance.

The communication apparatus 140 provides information to the information processing server 110 to confirm the existence or position of a charging station estimated in the information processing server 110, as will be described later in detail. Upon receiving information for promoting confirmation of the charging station from the information processing server 110, the communication apparatus 140, for example, answers whether the charging station actually exists at the estimated position of the charging station. In addition, the communication apparatus 140 can transmit, to the information processing server 110, a photo of a charger in the charging station or information concerning the characteristic of the charger (these pieces of information will simply be referred to as additional information). Note that some pieces of additional information can also be transmitted by the vehicle 130.

In addition, the communication apparatus 140 acquires the information of the position of the charging station from the information processing server 110, and uses the information of the position of the charging station together with the map information used in the communication apparatus 140. The communication apparatus 140 can also display, for example, the display 150 and display information representing the existence of charging stations on the map.

<Arrangement of Information Processing Server>

An example of the functional arrangement of the information processing server 110 will be described next with reference to FIG. 2. Note that functional blocks to be described with reference to the following drawings may be integrated or separated, and a function to be explained may be implemented by another block. In addition, a function to be explained as hardware may be implemented by software, and vice versa.

A communication unit 201 includes a communication circuit configured to communicate with a plurality of vehicles 130 or a plurality of communication apparatuses 140 via the network 111. The communication unit 201 transmits information to an external apparatus controlled by a control unit 202 or receives information from the external apparatus.

The control unit 202 includes a CPU 210 that is a center processing unit, and a RAM 211. The control unit 202 loads a program stored in a storage unit 204 into the RAM 211 and executes it, thereby controlling the operation of each unit in the control unit 202 and controlling the operation of each unit of the information processing server 110. In addition, the control unit 202 executes position information providing processing to be described later. The RAM 211 includes a volatile storage medium, for example, a DRAM, and temporarily stores parameters used by the control unit 202 to execute a program, processing results, and the like.

An operation unit 203 is an operation member such as a keyboard or a mouse used by the manager of the information processing server 110 to give an operation instruction or a module configured to accept an operation instruction given by remote control. Upon accepting an operation instruction, the operation unit 203 notifies the control unit 202 of the operation information.

The storage unit 204 includes a nonvolatile storage medium, for example, a semiconductor memory, and stores set values necessary for the operation of the information processing server 110. In addition, the storage unit 204 stores, in a vehicle database, information (the identification information of a vehicle, information concerning charging, information concerning a stop time, and the like) concerning the vehicle transmitted from the vehicle 130 or the communication apparatus 140. Furthermore, the storage unit 204 stores, in a charging station database, additional information and the like concerning a charging station transmitted from the vehicle 130 or the communication apparatus 140.

A display unit 205 includes a display panel, for example, an LCD or an OLED, and displays a setting user interface used by, for example, the manager to set the information processing server 110. Alternatively, the display unit 205 may perform display control to transmit displayable information to an external apparatus.

An information acquisition unit 212 acquires, via the communication unit 201, information concerning a vehicle or information concerning a charging station transmitted from the vehicle 130 or the communication apparatus 140. The information acquisition unit 212 stores these pieces of acquired information in the vehicle database and the charging station database.

An estimation unit 213 estimates a position where a charging station exists based on the information concerning the vehicle stored in the vehicle database. To confirm the existence or position of the charging station estimated by the estimation unit 213 from the user of the vehicle 130 or the communication apparatus 140, a confirmation unit 214 transmits information for promoting confirmation to the vehicle 130 or the communication apparatus 140, and acquires additional information by a response. Details of estimation processing by the estimation unit 213 and confirmation processing by the confirmation unit 214 will be described later.

A position providing unit 215 provides, (via the communication unit 201), the information of the position of the charging station estimated by the estimation unit 213 or the information of the estimated position of the charging station, which is further confirmed, to the vehicle 130 or the communication apparatus 140 associated with the vehicle.

A compensation setting unit 216 sets a compensation, for example, a point for the vehicle 130 or the communication apparatus 140 that acquires additional information by a response to the information for promoting confirmation.

<Arrangement of Vehicle>

Figure 3:
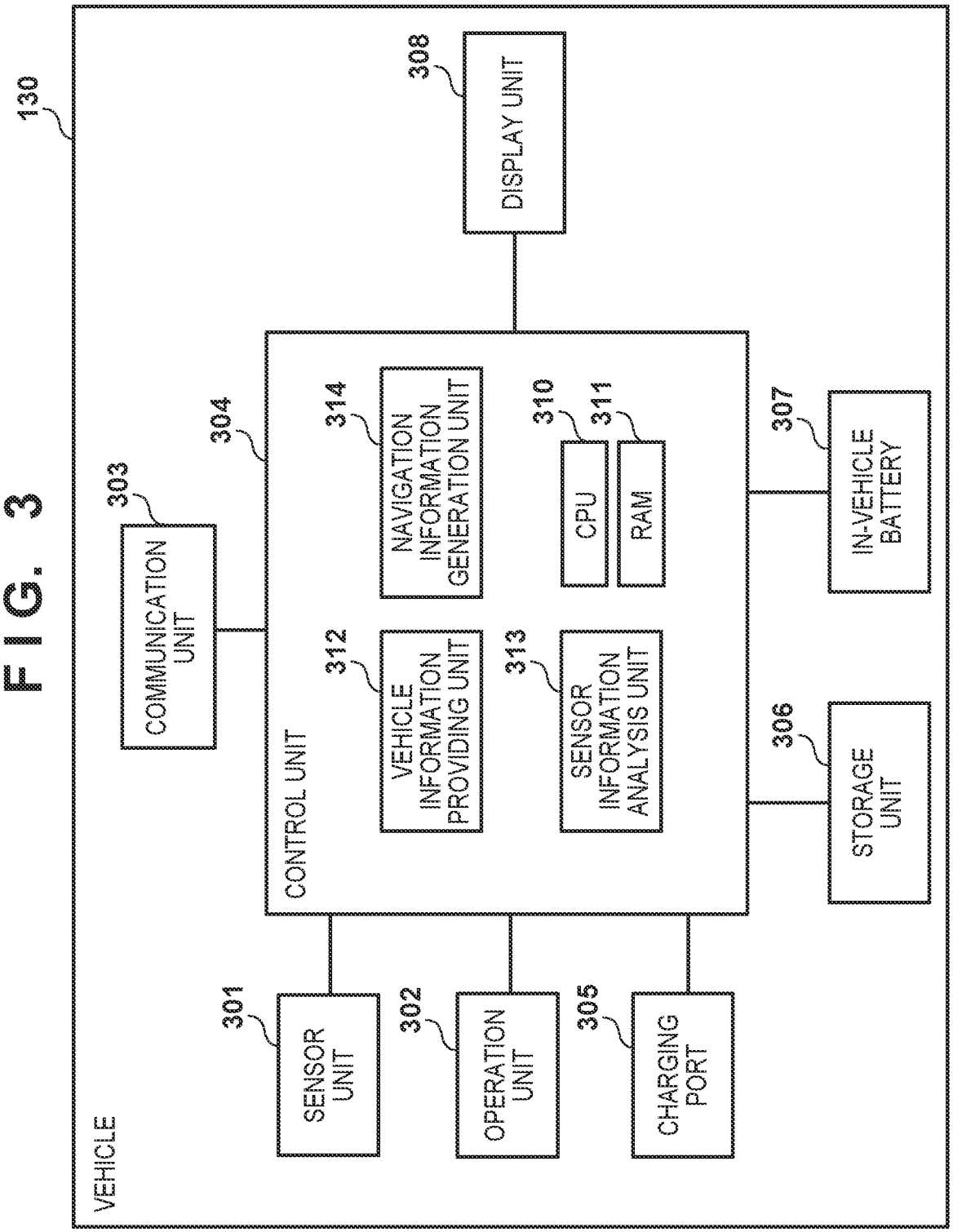
FIG. 3 is a block diagram showing an example of the functional arrangement of a vehicle according to the first embodiment.

An example of the arrangement of the vehicle 130 will be described next with reference to FIG. 3. Note that the arrangement shown in FIG. 3 illustrates, as one example, only functional blocks according to this embodiment of the functional blocks of the vehicle.

A sensor unit 301 includes various sensors configured to acquire information concerning the vehicle, that is, information concerning the position of the vehicle, the vehicle speed, the charging amount of a battery, connection of a cable to a charging port, opening/closing of the charging port, and the like. The sensors include, for example, a GPS, a speed sensor, a sensor configured to measure the charging amount, a sensor configured to detect connection of a cable to a charging port and opening/closing of the lid of the charging port, and the like. The data acquired from the sensors are partially or wholly stored in a storage unit 306 and processed by a control unit 304.

An operation unit 302 includes buttons and a touch panel attached in the vehicle 130, and can perform an operation on GUIs for navigation and various kinds of operations displayed on a display unit 308. The display unit 308 includes a display panel, for example, an LCD or an OLED, and displays map information for navigation, a user interface for an operation, various kinds of set values in the vehicle, a user interface used to set them, and the like.

A communication unit 303 is a communication device including, for example, a communication circuit and the like, and transmits/receives necessary data by, for example, connecting to the Internet via mobile communication such as LTE or connecting to the communication apparatus 140 via Bluetooth® communication.

The control unit 304 includes a CPU 310 and a RAM 311. For example, the CPU 310 executes a program stored in a storage unit 407, thereby controlling the operation of each functional block in the control unit 304 or each unit in the vehicle 130.

A vehicle information providing unit 312 provides data collected by the sensor unit 301 and analyzed by a sensor information analysis unit 313 to the information processing server 110 as information concerning the vehicle. The sensor information analysis unit 313 analyzes raw data of the sensors received from the sensor unit 301 or stored in the storage unit 306, thereby generating information concerning the position of the vehicle, the vehicle speed, the charging amount of a battery, connection of a cable to a charging port, opening/closing of the charging port, and the like.

Upon acquiring the information of the estimated position of a charging station from the information processing server 110, a navigation information generation unit 314 generates display map information or route guidance data using the information of the position of the charging station together with separately held map information. The display map information is displayed on the display unit 308.

A charging port 305 includes a charging port for quick charging or both a charging port for quick charging and a charging port for normal charging. The charging port 305 includes a lid (not shown). In a state in which the lid is open, a charging plug extended from the charger 120 can be inserted. Power from the charging port 305 undergoes voltage conversion or DC/AC conversion by the control unit 304 and is stored in an in-vehicle battery 307. The in-vehicle battery 307 is a high-voltage battery formed by a lithium ion battery or the like, and stores/discharges a DC current of, for example, 360 V.

The storage unit 306 includes a nonvolatile memory, for example, a semiconductor memory, and holds map information and the information of the estimated position of a charging station. The storage unit 306 also holds a program to be executed by the control unit 304. The storage unit 306 may hold data of a distributed ledger used in, for example, a block chain. For example, in a case in which a response is returned to information for promoting confirmation of an estimated charging station from the information processing server 110 or in a case in which additional information is provided, the block chain can store the information of a compensation concerning the provided information.

<Arrangement of Communication Apparatus>

Figure 4:
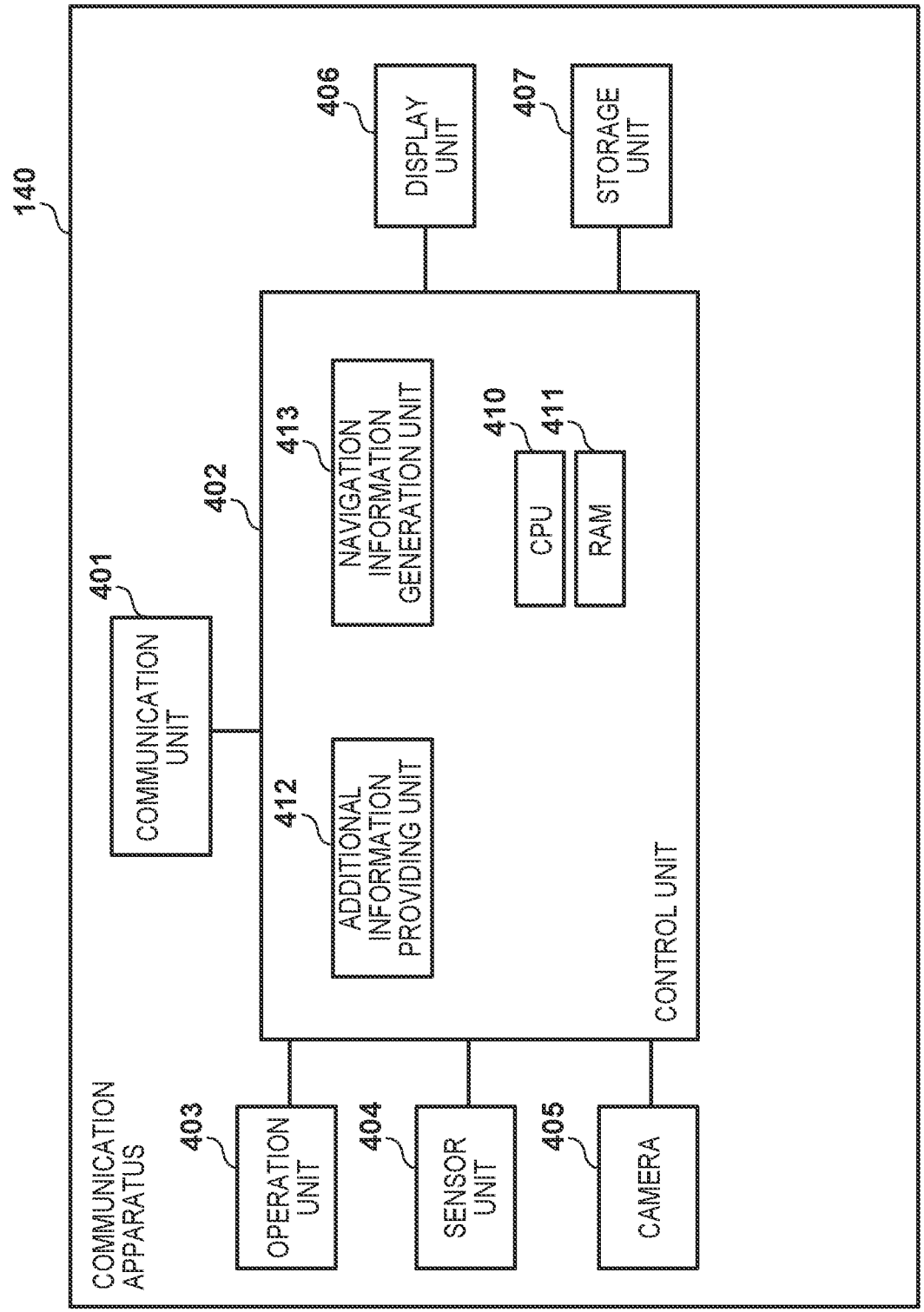
FIG. 4 is a block diagram showing an example of the functional arrangement of a communication apparatus according to the first embodiment.

The arrangement of the communication apparatus 140 according to this embodiment will be described next with reference to FIG. 4. A communication unit 401 includes a communication device including, for example, a communication circuit and the like, and transmits/receives necessary data by, for example, establishing wireless communication with an external apparatus by Bluetooth® or connecting to the Internet via mobile communication such as LTE.

A control unit 402 includes a CPU 410 and a RAM 411. For example, the CPU 410 executes a program stored in the storage unit 407, thereby controlling the operation of the entire communication apparatus 140 or providing additional information to be described later.

An operation unit 403 includes operation members, for example, a touch panel, buttons, and switches, and notifies the control unit 402 of information concerning operation contents in accordance with the operation contents from the user. The touch panel is arranged to overlap the display screen of a display unit 406, and provides a contact operation for a GUI generated by an application program or a program of the operating system.

A sensor unit 404 includes, for example, a GPS, and transmits sensed sensor information to the control unit 402. For example, the GPS measures the position of the communication apparatus 140. In addition, the sensor unit 404 includes a sensor for biometric authentication, and can acquire the biometric information of the user who uses the communication apparatus 140. A camera 405 includes an image sensor, and is used to, for example, acquire an image of a charger in a charging station. Position information measured by the sensor unit 404 is transmitted directly as additional information to the information processing server 110, or inserted as the position information of the image capturing position into the image obtained by capturing the charger 120 and transmitted as additional information.

The storage unit 407 includes a nonvolatile memory, for example, semiconductor memory, and stores an application program executed by the communication apparatus 140 or data used by the program. The display unit 406 is formed by, for example, an organic EL panel or a liquid crystal panel, and displays a GUI generated by an application program or a program of the operating system in accordance with an instruction of the control unit 402.

<Series of Operations of Position Information Providing Processing in Information Processing Server 110>

Figure 5:
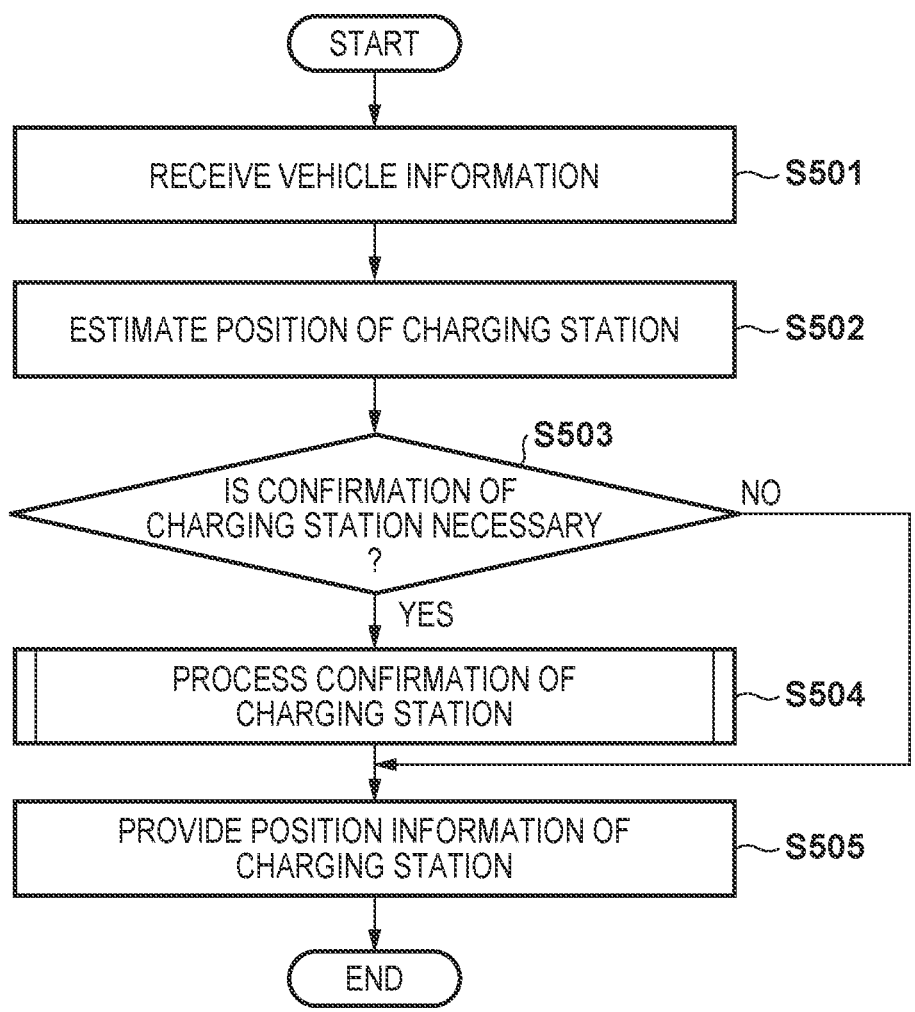
FIG. 5 is a flowchart showing a series of operations of position information providing processing in the information processing server according to the first embodiment.

A series of operations of position information providing processing in the information processing server 110 will be described next with reference to FIG. 5. Note that this processing is implemented by executing a program stored in the storage unit 204 by the CPU 210 of the control unit 202.

In step S501, the information acquisition unit 212 of the control unit 202 receives, from a chargeable vehicle, information concerning the vehicle. The control unit 202 stores the received information associated with the vehicle in the storage unit 204 in association with the identification information of the vehicle.

In step S502, the estimation unit 213 of the control unit 202 estimates the position of a charging station based on information concerning vehicles received from a plurality of vehicles in accordance with the reception of the information associated with the vehicle or at a predetermined interval. For example, the estimation unit uses the position information of a vehicle, information concerning the stop time of the vehicle, and at least one piece of information of information concerning the charging state of the battery of the vehicle, information concerning opening/closing of the lid of the charging port provided in the vehicle, information concerning connection of a cable to the charging port, and information concerning the charging history of the vehicle. For example, if the vehicle is stopping at a certain position for a predetermined time or more, and it is determined that the charging state of the vehicle is "charging in progress", it is estimated that the vehicle is stopping in a certain place and being charged. If a state in which the vehicle is connected to the charger and charged is managed in the vehicle as a specific operation mode (charger charging mode) of the vehicle, or if it can be determined, based on quick charging, that the charger charging mode is started, information concerning this mode may be acquired and used for estimation. If it can be estimated that the vehicle is stopping in a certain place and being charged, that place can be estimated as the position of a charging station. Furthermore, it may be estimated that charging is being performed considering that the lid of the charging port provided in the vehicle is open and that a cable is connected to the charging port. Alternatively, instead of setting a predetermined determination condition, information concerning a vehicle and the position of a charging station may be learned using machine learning such as a neural network, and the position of a charging station may be estimated in accordance with new input of information concerning the vehicle.

In addition, the estimation unit 213 determines whether the estimated position of the charging station is the position of a publicly usable charging station so not to reflect a charger for personal use on map information. A charger that charges only a single vehicle or several types of vehicles is a charger in an individual home at a high possibility. For this reason, in the estimation, for example, if the position of the same charging station is estimated in pieces of information concerning vehicles, which are received from a predetermined number or more of different vehicles (vehicles with different pieces of identification information), it is determined that the charging station is publicly usable.

In step S503, the control unit 202 determines whether confirmation of the charging station is necessary. For example, if it is estimated that a charging station exists at a position different from a position for which the existence of a charging station is already confirmed (that is, a new charging station exists), it is determined that confirmation of the charging station is necessary. Upon determining that confirmation of the charging station is necessary, the control unit 202 advances to step S504. Otherwise, the control unit 202 advances to step S505.

In step S504, the confirmation unit 214 of the control unit 202 executes confirmation processing for the estimated charging station. The confirmation processing will be described later.

In step S505, the position providing unit 215 of the control unit 202 provides the information of the position of the charging station to the vehicle 130 or the communication apparatus 140 associated with the vehicle 130 such that the information of the position of the charging station is reflected on the map information. Note that the information of the position of the charging station may be provided only when it concerns a new charging station. In addition, the position information may be provided only when the confirmation of the position of the charging station is performed by a predetermined number or more of users. This can increase the reliability of position information. When the information of the position of the charging station is provided, the control unit 202 ends the series of operations concerning position information providing processing.

In this way, the position of a charging station is estimated using information concerning a vehicle provided from a plurality of vehicles, and the information of the position is provided. This makes it possible to automatically reflect the position of a newly installed charging station on map information and provide accurate position information of the charging station. That is, it is possible to quickly specify the position of a charging station in use and reflect it on a map.

<Series of Operations Concerning Confirmation Processing>

Figure 6:
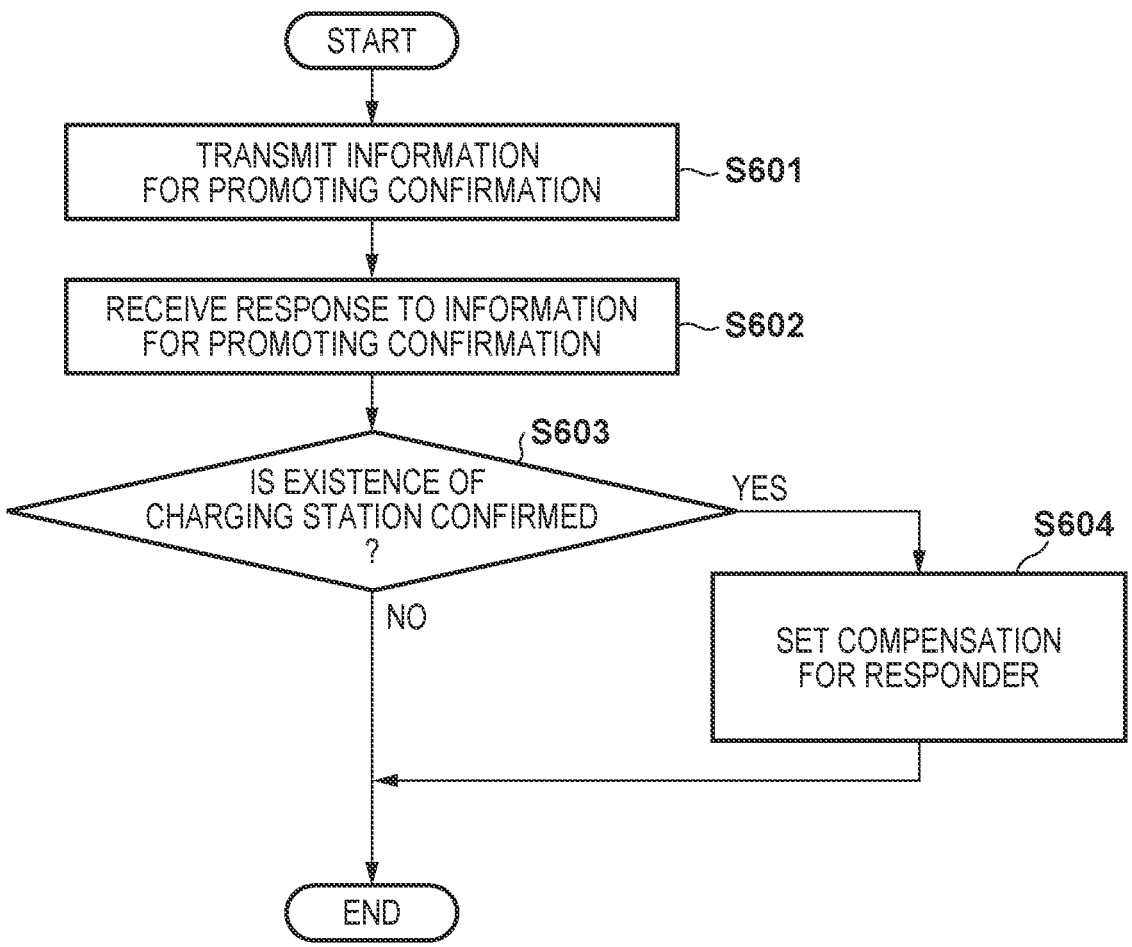
FIG. 6 is a flowchart showing a series of operations of confirmation processing in the information processing server according to the first embodiment.

A detailed operation of the confirmation processing in step S503 will be described next with reference to FIG. 6.

In step S601, the confirmation unit 214 transmits information for promoting confirmation to the vehicle 130 or the communication apparatus 140 associated with the vehicle 130 to confirm the existence or position of an estimated charging station. The information for promoting confirmation includes, for example, information for inquiring whether a charging station exists at the estimated position. The information also includes information for requesting providing of a photo of the charger in the charging station or information concerning the characteristic of the charger (that is, additional information). If a photo of the charger can be obtained, the existence of the charging station can be confirmed humanly or mechanically, and the position information can also be examined. The information concerning the characteristic of the charger includes information representing a charging method (for example, CHAdemo) supported by the charger, whether quick charging is possible, how many vehicles can be charged simultaneously, and what kind of paying method the charger supports.

The confirmation unit 214 may inquire of the vehicle about whether the vehicle that could estimate the position of the charging station is still under charging or stopping at the same position, and if the vehicle is under charging or stopping at the same position, transmit the information for promoting confirmation. This can transmit the information for promoting confirmation to the vehicle staying at the charging station and raise the response acquisition possibility or the accuracy of information.

In step S602, the confirmation unit 214 receives a response to the information for promoting confirmation. The confirmation unit 214 stores, in the charging station database, the received response to the information for promoting confirmation.

In step S603, the confirmation unit 214 determines, based on the response to the information for promoting confirmation, whether the existence of a charging station can be confirmed. If the response includes an answer that, for example, a charging station exists at the estimated position, the confirmation unit 214 determines that the existence of a charging station can be confirmed. Alternatively, if an answer concerning predetermined additional information is included in addition to the answer that a charging station exists, it may be determined that the existence of a charging station can be confirmed. Upon determining that the existence of a charging station can be confirmed, the confirmation unit 214 advances to step S604. Otherwise, the confirmation processing is ended.

In step S604, the confirmation unit 214 sets a compensation for a responder that has provided the response to the information for promoting confirmation. As for the compensation, for example, the larger the number of items of the response of the responder is, the higher the point to be given is. When the setting of the compensation is completed, the confirmation unit 214 ends the confirmation processing.

In the above-described way, the information processing server 110 promotes the vehicle 130 or the communication apparatus 140 associated with the vehicle 130 to confirm the estimated position of a charging station, thereby increasing the reliability of the estimated position of the charging station. In addition, it is possible to provide a motivation to information providing by setting a compensation to the user who has transmitted the response to the information for promoting confirmation. Furthermore, when additional information is collected using the information for promoting confirmation, the information of the position of a charging station can be more enriched, and the value of the information providing service of the charging station can be increased.

Second Embodiment

The second embodiment of the present invention will be described below. In the first embodiment, an example in which estimation of the position of a charging station is performed in an information processing server has been described. In the second embodiment, an example in which estimation of the position of a charging station can be performed on the vehicle side as well, and the estimated position of the charging station can be provided to an information processing server will be described. An information processing server 110 can receive information concerning a vehicle and provide the information of the estimated position of a charging station to the vehicle, as in the first embodiment. The information processing server 110 can also receive the information of the estimated position of a charging station from a certain vehicle and provide the information of the position of the charging station to another vehicle. Note that in the explanation of the embodiment, the same reference numerals denote the same or substantially same functions. A repetitive description will be omitted, and different points will mainly be described.

<Arrangement of Information Processing Server>

Figure 2:
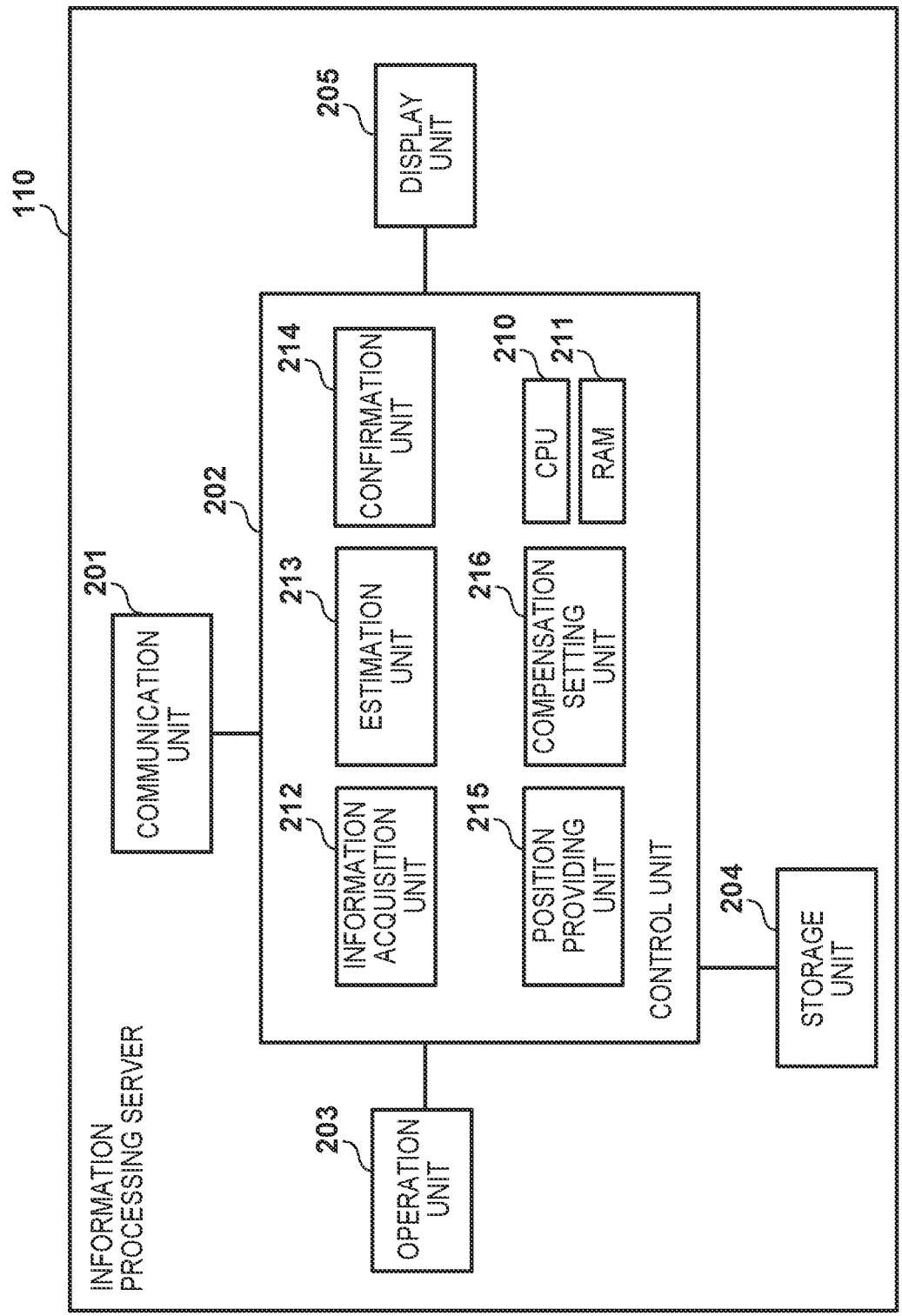
FIG. 2 is a block diagram showing an example of the functional arrangement of an information processing server according to the first embodiment.

The arrangement of the information processing server 110 is substantially the same as the arrangement shown in FIG. 2. If an information acquisition unit 212 of a control unit 202 acquires the information of the estimated position of a charging station from a vehicle 130 capable of estimating the position of a charging station, the position of the charging station is stored in a charging station database. At this time, the information of the position of the charging station may be registered only when the received information of the position of the charging station is not included in the charging station database. If the information of the position of the charging station is stored, a position providing unit 215 provides the registered information of the position of the charging station to another vehicle.

<Arrangement of Vehicle>

Figure 7:
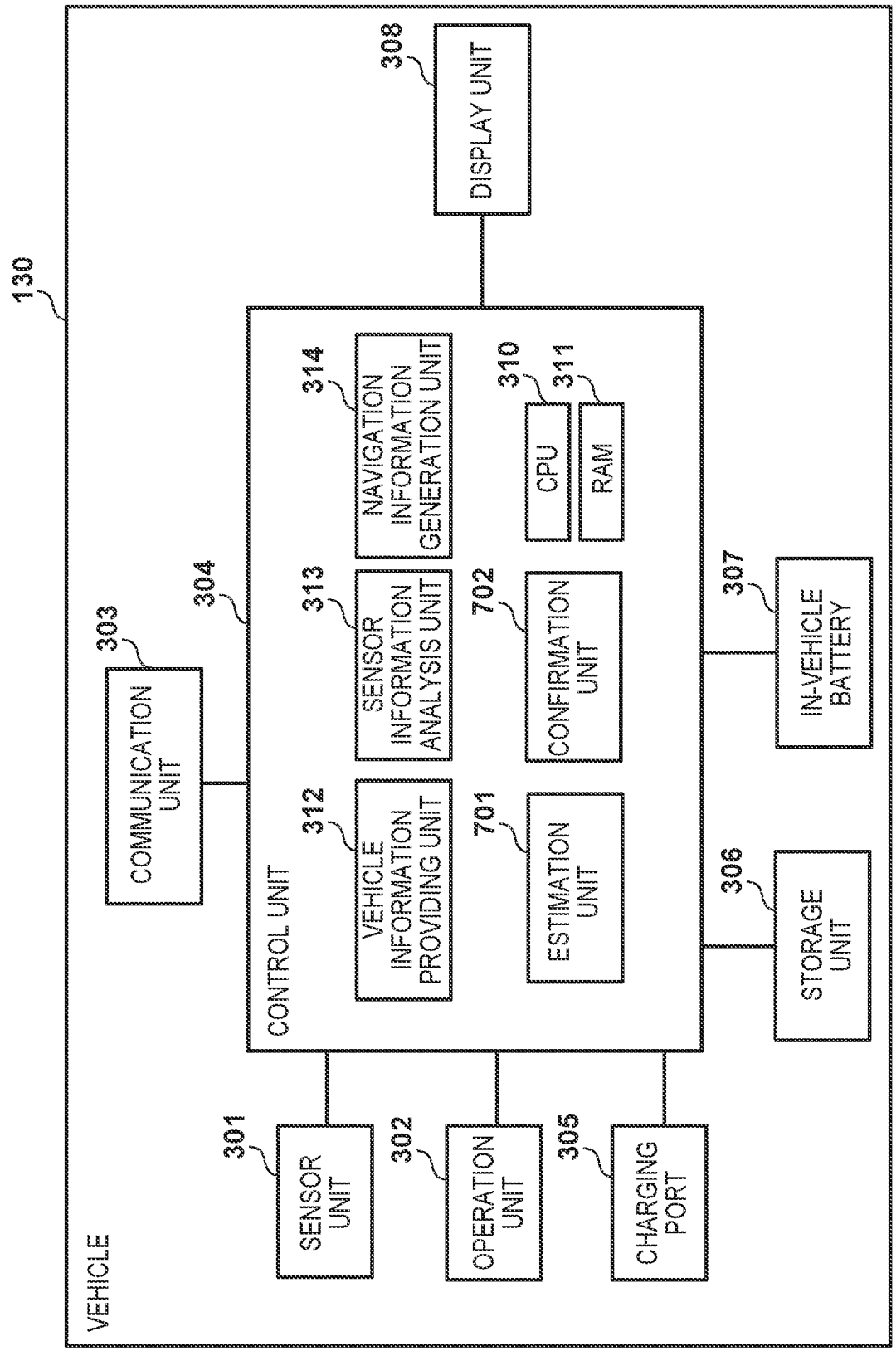
FIG. 7 is a block diagram showing an example of the functional arrangement of a vehicle according to the second embodiment.

The arrangement of the vehicle 130 according to this embodiment will be described next with reference to FIG. 7. The vehicle according to this embodiment is different in that a control unit 304 further includes an estimation unit 701 and a confirmation unit 702.

The estimation unit 701 estimates a position where a charging station exists based on information concerning the vehicle and obtained by a sensor information analysis unit 313. In addition, to confirm the existence or position of the charging station estimated by the estimation unit 701 from the user of the vehicle 130, the confirmation unit 702 displays information for promoting confirmation on a display unit 308 and acquires additional information by a response. Alternatively, the confirmation unit 702 transmits the information for promoting confirmation to a communication apparatus 140 associated with the vehicle 130, and acquires additional information by a response. Details of estimation processing by an estimation unit 701 and confirmation processing by a confirmation unit 702 will be described later.

A vehicle information providing unit 312 transmits the pieces of information to the information processing server 110 such that the estimated position of the charging station or the additional information is reflected on map information.

<Series of Operations of Estimation Processing in Vehicle>

Figure 8:
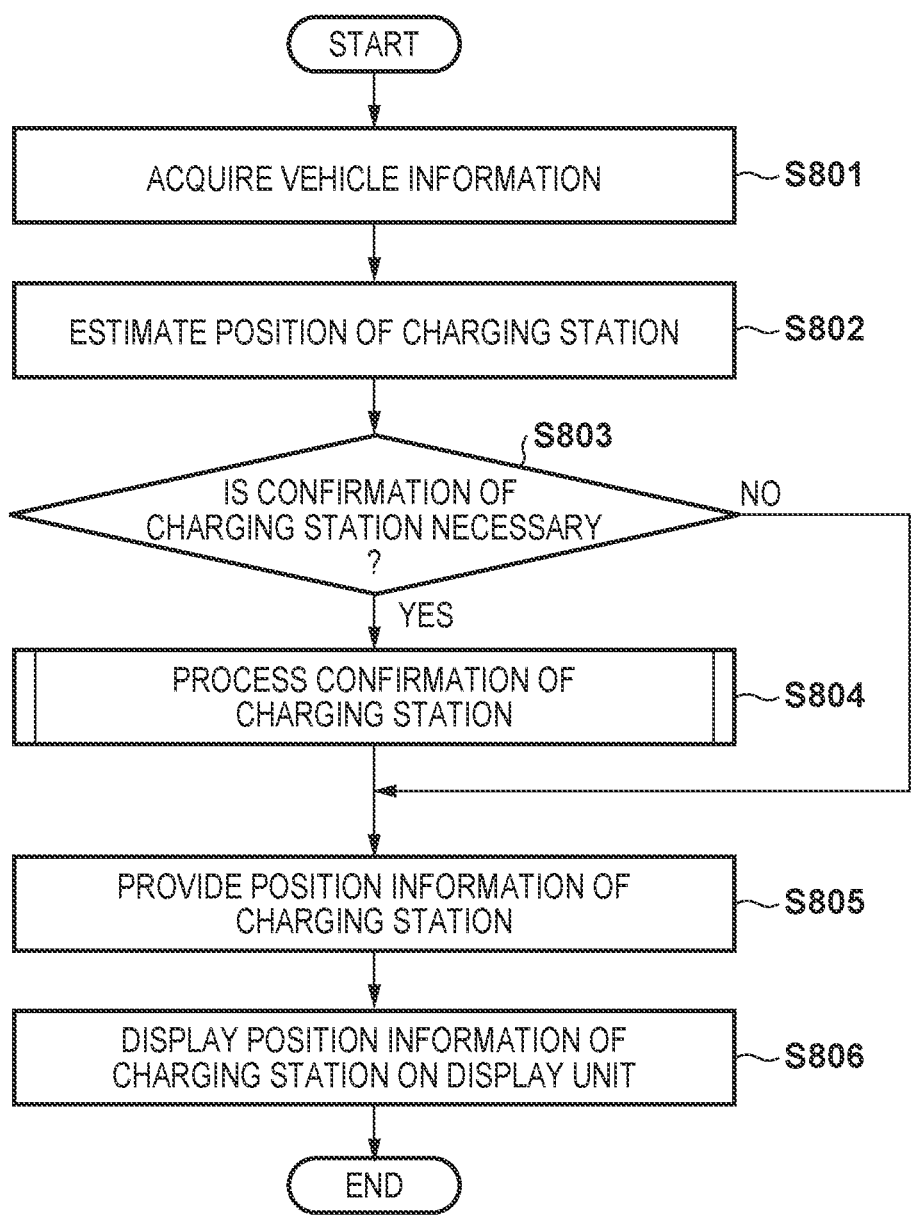
FIG. 8 is a flowchart showing a series of operations of position information providing processing in the vehicle according to the second embodiment.

A series of operations of estimation processing in the vehicle will be described next with reference to FIG. 8. Note that this processing is implemented by executing a program stored in a storage unit 306 by a CPU 310 of the control unit 304. For example, the control unit 304 starts the estimation processing in the vehicle when a predetermined time or more has elapsed from the stop of the vehicle.

In step S801, the control unit 304 acquires information concerning the vehicle from the sensor information analysis unit 313.

In step S802, the estimation unit 701 of the control unit 304 estimates the position of a charging station based on the information concerning the vehicle in the self-vehicle. For example, the estimation unit 701 uses the position information of the vehicle, information concerning the stop time of the vehicle, and at least one piece of information of information concerning the charging state of the battery of the vehicle, information concerning opening/closing of the lid of a charging port provided in the vehicle, information concerning connection of a cable to the charging port, and information concerning the charging history of the vehicle.

For example, if the vehicle is stopping at a certain position for a predetermined time or more, and it is determined that the charging state of the vehicle is "charging in progress", it is estimated that the vehicle is stopping in a certain place and being charged. If a state in which the vehicle is connected to the charger and charged is managed in the vehicle as a specific operation mode (charger charging mode) of the vehicle, or if it can be determined, based on quick charging, that the charger charging mode is started, information concerning this mode may be acquired and used for estimation. If it can be estimated that the vehicle is stopping in a certain place and being charged, that place can be estimated as the position of a charging station. Furthermore, it may be estimated that charging is being performed considering that the lid of the charging port provided in the vehicle is open and that a cable is connected to the charging port. Alternatively, instead of setting a predetermined determination condition, information concerning a vehicle and the position of a charging station may be learned using machine learning such as a neural network, and the position of a charging station may be estimated in accordance with new input of information concerning the vehicle.

In addition, the estimation unit 701 determines whether the estimated position of the charging station is the position of a publicly usable charging station so not to reflect a charger in home or for personal use on map information. For example, if the position of the vehicle is the position of the home or a position registered as the home of a friend or a relative, the position is excluded from determination. Then, if the position of the charging station is estimated at a position other than these positions, it is determined that the charging station can publicly be used.

In step S803, the control unit 304 determines whether confirmation of the charging station is necessary. For example, if it is estimated that a charging station exists at a position different from a position for which the existence of a charging station is already confirmed (that is, a new charging station exists), it is determined that confirmation of the charging station is necessary. Upon determining that confirmation of the charging station is necessary, the control unit 304 advances to step S804. Otherwise, the control unit 304 advances to step S805.

In step S804, the confirmation unit 702 of the control unit 304 executes confirmation processing for the estimated charging station. The confirmation processing will be described later.

In step S805, the vehicle information providing unit 312 of the control unit 304 provides the information of the position of the charging station to the information processing server 110 such that the information of the position of the charging station is reflected on the map information. Additionally, in step S806, the control unit 304 displays the information of the position of the charging station on the display unit 308 in accordance with the current position. After that, the control unit 304 ends the series of operations concerning position information providing processing.

The position of a charging station is thus estimated in the vehicle, and the estimation result is provided to the information processing server, thereby reducing the processing load on the server side concerning the estimation processing of a charging station and distributing the processing load.

<Series of Operations Concerning Confirmation Processing>

A detailed operation of the confirmation processing in step S803 will be described next with reference to FIG. 9.

In step S901, the confirmation unit 702 displays information for promoting confirmation on the display unit 308 of the vehicle 130 to confirm the existence or position of an estimated charging station. Alternatively, the confirmation unit 702 may transmit the information for promoting confirmation to the communication apparatus 140 associated with the vehicle 130. The information for promoting confirmation includes, for example, information for inquiring whether a charging station exists at the estimated position. The information also includes information for requesting providing of a photo of the charger in the charging station or information concerning the characteristic of the charger (that is, additional information). The confirmation unit 702 may receive the photo of the charger from the communication apparatus 140. The information concerning the characteristic of the charger is the same as in the first embodiment. The confirmation unit 702 acquires input of the information via an operation unit 302 of the vehicle 130.

The confirmation unit 702 may display the information for promoting confirmation when the vehicle is under charging or stopping at the same position. This can display the information for promoting confirmation during the stay of the vehicle at the charging station and raise the response acquisition possibility or the accuracy of information.

In step S902, the confirmation unit 702 receives a response to the information for promoting confirmation. The confirmation unit 702 temporarily stores, in the storage unit 306, the acquired response to the information for promoting confirmation.

In step S903, the confirmation unit 702 determines, based on the response to the information for promoting confirmation, whether the existence of a charging station can be confirmed. If the response includes an answer that, for example, a charging station exists at the estimated position, the confirmation unit 702 determines that the existence of a charging station can be confirmed. Alternatively, if an answer concerning predetermined additional information is included in addition to the answer that a charging station exists, it may be determined that the existence of a charging station can be confirmed. Upon determining that the existence of a charging station can be confirmed, the confirmation unit 702 advances to step S904. Otherwise, the confirmation processing is ended.

In step S904, the confirmation unit 702 transmits a request to the information processing server 110 to set a compensation for a responder that has provided the response to the information for promoting confirmation. At this time, the response to the information for promoting confirmation, which is provided by the user, may be transmitted to the information processing server 110. This makes it possible to give a point in accordance with, for example, the number of items of the response of the responder on the side of the information processing server 110. When the transmission of the compensation setting request is completed, the confirmation unit 702 ends the confirmation processing.

In the above-described way, for the estimated position of a charging station, the vehicle 130 displays the information for promoting confirmation on the display unit 308 of the vehicle 130, or transmits the information for promoting confirmation to the communication apparatus 140 associated with the vehicle 130. This can increase the reliability of the estimated position of the charging station. In addition, it is possible to provide a motivation to information providing by setting a compensation to the user who has responded to the information for promoting confirmation. Furthermore, when additional information is collected using the information for promoting confirmation, the information of the position of a charging station can be more enriched, and the value of the information providing service of the charging station can be increased.

Summary of Embodiments

1. According to above embodiment, there is provided an information processing server (for example, reference numeral 110) comprising:

a reception unit (for example, 201) configured to receive, from a vehicle chargeable from an outside, predetermined information of the vehicle;

an estimation unit (for example, 213) configured to estimate, based on the predetermined information received from each of a plurality of vehicles, a position of a charging station used to charge the vehicle; and a providing unit (for example, 215) configured to provide information of the estimated position of the charging station such that the estimated position of the charging station is reflected on map information.

According to this embodiment, it is possible to automatically reflect the position of a newly installed charging station on the map information and provide accurate position information of the charging station. That is, it is possible to quickly specify the position of a charging station in use and reflect it on a map.

2. In the above embodiment, the predetermined information includes:

position information of the vehicle;

information concerning a stop time of the vehicle; and at least one piece of information of information concerning a charging state of a battery of the vehicle, information concerning opening/closing of a lid of a charging port provided in the vehicle, information concerning connection of a cable to the charging port, and information concerning a charging history of the vehicle.

According to this embodiment, it is possible to estimate the position of the charging station using data acquirable by a sensor provided in the vehicle.

3. In the above embodiment, the providing unit provides the information of the estimated position of the charging station to the plurality of vehicles (for example, S505).

According to this embodiment, it is possible to widely use the information of the added charging station among the plurality of vehicles.

4. In the above embodiment, the providing unit provides the information of the estimated position of the charging station to a communication apparatus associated with the vehicle (for example, S505).

According to this embodiment, it is possible to use the information of the added charging station even in the communication apparatus other than the vehicle based on the information of the vehicle.

5. In the above embodiment, the information processing server further comprises a confirmation unit (for example, S504) configured to confirm existence of the estimated charging station, and the confirmation unit transmits information for promoting confirmation of the estimated charging station to one of the vehicle and a communication apparatus associated with the vehicle (for example, S601), and confirms the existence of the estimated charging station based on a response (for example, S602) to the information for promoting confirmation (for example, S603).

According to this embodiment, it is possible to increase the reliability of the information of the estimated position of the charging station.

6. In the above embodiment, if the position of the charging station is estimated, the confirmation unit confirms the existence of the estimated charging station before the providing unit provides the information of the estimated position of the charging station to one of the vehicle and the communication apparatus associated with the vehicle (for example, S504, S505).

According to this embodiment, it is possible to increase the reliability of the estimated position of the charging station and then provide the information of the position to the vehicle or the communication apparatus.

7. In the above embodiment, the confirmation unit acquires additional information (for example, S602) concerning the estimated charging station by a response to the information for promoting confirmation, and the providing unit provides the additional information to one of the vehicle and the communication apparatus associated with the vehicle such that the additional information concerning the estimated charging station is reflected on the map information.

According to this embodiment, by collecting the additional information, it is possible to enrich the information of the position of the charging station and increase the value of the information providing service of the charging station.

8. In the above embodiment, the predetermined information includes identification information of the vehicle, and the estimation unit determines, based on the predetermined information received from each of different vehicles in not less than a predetermined number, whether the estimated position of the charging station is a position of a publicly usable charging station.

According to this embodiment, it is possible to exclude determination by charging using a charger in an individual home.

9. According to the above embodiment, there is provided an information processing method comprising:

receiving, from a vehicle chargeable from an outside, predetermined information of the vehicle (for example, S501);

estimating, based on the predetermined information received from each of a plurality of vehicles, a position of a charging station used to charge the vehicle (for example, S502); and providing information of the estimated position of the charging station such that the estimated position of the charging station is reflected on map information (for example, S505).

According to this embodiment, it is possible to automatically reflect the position of a newly installed charging station on the map information and provide accurate position information of the charging station. That is, it is possible to quickly specify the position of a charging station in use and reflect it on a map.

10. A vehicle (for example, 130) according to the above embodiment is a vehicle that is chargeable from an outside, comprising:

an acquisition unit (for example, 301) configured to acquire predetermined information of the vehicle;

an estimation unit (for example, 701) configured to estimate, based on the predetermined information, a position of a charging station used to charge the vehicle; and a providing unit (for example, 312) configured to provide the estimated position of the charging station to an external information processing server such that the estimated position of the charging station is reflected on map information.

According to this embodiment, it is possible to automatically reflect the position of a newly installed charging station on the map information and provide accurate position information of the charging station. That is, it is possible to quickly specify the position of a charging station in use and reflect it on a map.

11. In the above embodiment, the vehicle further comprises a confirmation unit (for example, 702) configured to confirm existence of the estimated charging station, and the confirmation unit displays, on a display unit of the vehicle, information for promoting confirmation of the estimated charging station, and confirms the existence of the estimated charging station based on a response to the information for promoting confirmation.

According to this embodiment, the reliability of the information of the estimated position of the charging station can be increased, and the user can perform a confirmation operation in the vehicle.

12. In the above embodiment, the vehicle further comprises a confirmation unit (for example, 702) configured to confirm existence of the estimated charging station, and the confirmation unit transmits information for promoting confirmation of the estimated charging station to a communication apparatus associated with the vehicle, and confirms the existence of the estimated charging station based on a response to the information for promoting confirmation.

According to this embodiment, the reliability of the information of the estimated position of the charging station can be increased, and the user can move in the neighborhood of the charger as needed and easily perform confirmation by capturing the charger or the like.

13. A control method of a vehicle (for example, 130) according to the above embodiment is a control method of a vehicle that is chargeable from an outside, the method comprising:

acquiring predetermined information of the vehicle (for example, S801);

estimating, based on the predetermined information, a position of a charging station used to charge the vehicle (for example, S802); and providing the estimated position of the charging station to an external information processing server such that the estimated position of the charging station is reflected on map information (for example, S805).

According to this embodiment, it is possible to automatically reflect the position of a newly installed charging station on the map information and provide accurate position information of the charging station. That is, it is possible to quickly specify the position of a charging station in use and reflect it on a map.

14. An information providing system (for example, 100) according to the above embodiment is an information providing system that comprises a plurality of vehicles chargeable from an outside, and an information processing server, wherein the vehicle comprises:

a transmitter that transmits predetermined information acquired in the vehicle to the information processing server; and a display for displaying map information;

the information processing server comprises:

a reception unit configured to receive, from the vehicle, the predetermined information of the vehicle;

an estimation unit configured to estimate, based on the predetermined information received from each of a plurality of vehicles, a position of a charging station used to charge the vehicle; and a providing unit configured to provide information of the estimated position of the charging station to the vehicle such that the estimated position of the charging station is reflected on the map information displayed in the vehicle.

According to this embodiment, it is possible to automatically reflect the position of a newly installed charging station on the map information and provide accurate position information of the charging station. That is, it is possible to quickly specify the position of a charging station in use and reflect it on a map.

15. A non-transitory computer-readable storage medium according to the above embodiment stores a program for causing a computer to function as each unit of an information processing server.

According to this embodiment, it is possible to automatically reflect the position of a newly installed charging station on the map information and provide accurate position information of the charging station. That is, it is possible to quickly specify the position of a charging station in use and reflect it on a map.

What is claimed is:

1. An information processing method comprising:

receiving, from a vehicle chargeable from an outside, predetermined information of the vehicle;

estimating, based on the predetermined information received from each of a plurality of vehicles, a position of a charging station used to charge the vehicle, wherein the position of the charging station has not been reflected on map information;

confirming an existence of the estimated charging station; and providing information of the estimated position of the confirmed charging station such that the estimated position of the charging station is reflected on map information, wherein the confirming comprises transmitting information for promoting confirmation of the estimated charging station to one of a vehicle and a communication apparatus associated with the vehicle, and confirming the existence of the estimated charging station based on a response to the information for promoting confirmation.

2. The information processing method according to claim 1, wherein the predetermined information includes:

position information of the vehicle;

information concerning a stop time of the vehicle; and at least one piece of information of information concerning a charging state of a battery of the vehicle, information concerning opening/closing of a lid of a charging port provided in the vehicle, information concerning connection of a cable to the charging port, and information concerning a charging history of the vehicle.

3. The information processing method according to claim 1, wherein the providing the information comprises providing the information of the estimated position of the charging station to the plurality of vehicles.

4. The information processing method according to claim 1, wherein the providing the information comprises providing the information of the estimated position of the charging station to a communication apparatus associated with the vehicle.

5. The information processing method according to claim 1, wherein if the position of the charging station is estimated, the confirming the existence of the estimated charging station is performed before providing the information of the estimated position of the charging station to one of the vehicle and the communication apparatus associated with the vehicle.

6. The information processing method according to claim 1, wherein the confirming the existence of the estimated charging station comprises acquiring additional information concerning the estimated charging station by a response to the information for promoting confirmation, and the providing the information comprises providing the additional information to one of the vehicle and the communication apparatus associated with the vehicle such that the additional information concerning the estimated charging station is reflected on the map information.

7. An information providing system that comprises a plurality of vehicles chargeable from an outside, and an information processing server, wherein the vehicle comprises:

a transmitter that transmits predetermined information acquired in the vehicle to the information processing server; and a display for displaying map information; and the information processing server comprises:

a receiver that receives, from the vehicle, the predetermined information of the vehicle;

a memory; and at least one processor or circuit which functions as:

an estimation unit configured to estimate, based on the predetermined information received from each of a plurality of vehicles, a position of a charging station used to charge the vehicle, wherein the position of the charging station has not been reflected on map information;

a confirmation unit configured to confirm existence of the estimated charging station; and a providing unit configured to provide information of the estimated position of the charging station to the vehicle such that the estimated position of the charging station is reflected on the map information displayed in the vehicle, wherein the confirmation unit transmits information for promoting confirmation of the estimated charging station to one of a vehicle and a communication apparatus associated with the vehicle, and confirms the existence of the estimated charging station based on a response to the information for promoting confirmation.

8. The information providing system according to claim 7, wherein the vehicle further comprises at least one processor or circuit that functions as a confirmation unit configured to confirm existence of the estimated charging station, and the confirmation unit displays, on the display of the vehicle, information for promoting confirmation of the estimated charging station, and confirms the existence of the estimated charging station based on a response to the information for promoting confirmation.

9. The information providing system according to claim 7, wherein the vehicle further comprises at least one processor or circuit that functions as a confirmation unit configured to confirm existence of the estimated charging station, and the confirmation unit transmits information for promoting confirmation of the estimated charging station to a communication apparatus associated with the vehicle, and confirms the existence of the estimated charging station based on a response to the information for promoting confirmation.

10. An information processing method comprising:

receiving, from a vehicle chargeable from an outside, predetermined information of the vehicle;

estimating, based on the predetermined information received from each of a plurality of vehicles, a position of a charging station used to charge the vehicle, wherein the position of the charging station has not been reflected on map information; and providing information of the estimated position of the charging station such that the estimated position of the charging station is reflected on map information, wherein the predetermined information includes identification information of the vehicle, the estimating the position of the charging station comprises determining, based on the predetermined information received from each of different vehicles in not less than a predetermined number, whether the estimated position of the charging station is a position of a publicly usable charging station, and the providing information of the estimated position of the charging station is performed in a case where the estimated position of the charging station is determined as a position of a publicly usable charging station.

11. An information providing system that comprises a plurality of vehicles chargeable from an outside, and an information processing server, wherein the vehicle comprises:

a transmitter that transmits predetermined information acquired in the vehicle to the information processing server; and a display for displaying map information;

the information processing server comprises:

a receiver that receives, from the vehicle, the predetermined information of the vehicle;

a memory; and at least one processor or circuit which functions as:

an estimation unit configured to estimate, based on the predetermined information received from each of the plurality of vehicles, a position of a charging station used to charge the vehicle, wherein the position of the charging station has not been reflected on map information; and a providing unit configured to provide information of the estimated position of the charging station to the vehicle such that the estimated position of the charging station is reflected on the map information displayed in the vehicle, wherein the predetermined information includes identification information of the vehicle, the estimation unit determines, based on the predetermined information received from each of different vehicles in not less than a predetermined number, whether the estimated position of the charging station is a position of a publicly usable charging station, and the providing unit provides information of the estimated position of the charging station in a case where the estimated position of the charging station is determined as a position of a publicly usable charging station.

* * * * *